US009445028B2

(12) United States Patent  
Bock (10) Patent No.: US 9,445,028 B2  
(45) Date of Patent: Sep. 13, 2016

(54) IMAGE SENSORS FOR GENERATING FLOATING POINT NUMBERS

(71) Applicant: Semiconductor Components Industries, LLC, Phoenix, AZ (US)

(72) Inventor: Nikolai Bock, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 14/455,752

(22) Filed: Aug. 8, 2014

(65) Prior Publication Data

US 2015/0054999 A1   Feb. 26, 2015

Related U.S. Application Data

(60) Provisional application No. 61/869,507, filed on Aug. 23, 2013.

(51) Int. Cl.  
*H04N 5/378* (2011.01)

(52) U.S. Cl.  
CPC .................................. *H04N 5/378* (2013.01)

(58) Field of Classification Search  
None  
See application file for complete search history.

(56) References Cited

U.S. PATENT DOCUMENTS

2012/0157852 A1* 6/2012 Wegener et al. ............. 600/454  
2012/0287316 A1* 11/2012 Kim et al. .................... 348/294

OTHER PUBLICATIONS

Bock et al., "A Wide-VGA CMOS Image Sensor with Global Shutter and Extended Dynamic Range" Micron Imaging, Mocton Technology Inc., Pasadena, CA., pp. 222-225, <URL: http://www.imagesensors.org/Past%20Workshops/2005%20Workshop/2005%20Papers/56%20Bock%20et% 20al.pdf>.

Huang et al., "Design of a PCT-Inspired Segmented ADC for High-Speed Column-Parallel CMOS Image Sensor", Forza Silicon Corporation, Pasadena, CA., 4 pages <URL: http://www.imagesensors.org/Past%20Workshops/2011%20Workshop/2011%20Papers/R58_Huang_SegmentedADC.pdf> .

Lee et al., "A 10b Column-wise Two-step Single-slope ADC for High-speed CMOS Image Sensor" Yonsei University, Seoul, Korea, pp. 196-199 <URL: http://www.imagesensors.org/Past%20Workshops/2007%20Workshop/2007%20Papers/050%20Lee%20et% 20al.pdf> .

Gonzalez et al., "Diginal Image Processing" Second Edition, 2002, 190 pages, Prentice-Hall, Inc., Upper Saddle River, New Jersey.

* cited by examiner

*Primary Examiner* — Mark Monk  
(74) *Attorney, Agent, or Firm* — Treyz Law Group, P.C.; Jason Tsai; Vineet Dixit (57) ABSTRACT

An image sensor may include an array of image sensor pixels arranged in rows and columns. Each image pixel arranged along a given column may be coupled to analog-to-digital converter (ADC) circuitry that is capable of converting analog pixel signals into a digital floating point equivalent representation. The ADC circuitry may be configured to perform exponent conversion during a first time period at a nominal reference voltage level and to perform mantissa conversion a subsequent time period at an adjustable reference voltage level that can be less than the nominal reference voltage level. Readout circuitry implemented in this way can perform conversion in a shorter period of time using a reduced resolution ADC to serve effectively as a higher resolution ADC.

17 Claims, 6 Drawing Sheets

IMAGE SENSORS FOR GENERATING FLOATING POINT NUMBERS

This application claims the benefit of provisional patent application No. 61/869,507, filed Aug. 23, 2013, which is hereby incorporated by reference herein in its entirety.

BACKGROUND

This relates generally to imaging devices, and more particularly, to CMOS image sensors.

Modern electronic devices such cellular telephones, cameras, and computers often use digital image sensors. Imagers (i.e. image sensors) may be formed from a two-dimensional array of image sensing pixels. Each pixel may include a photosensor such as a photodiode that receives incident photons (light) and converts the photons into electrical signals. Image sensors are sometimes designed to provide images to electronic devices using a Joint Photographic Experts Group (JPEG) format or any other suitable image format.

As image sensor pixels become smaller in size and as image resolution increases, image sensor data rates continue to increase as a result. To meet performance requirements at high data rates, a column parallel architecture in which each pixel column is coupled to a respective analog-to-digital converter (ADC) has been developed. Typically, each column ADC is required to exhibit high resolution such as 12-bit resolution. High dynamic range (HDR) image sensors may require even more ADC resolution. Such types of high resolution ADCs can consume a significant amount of power, occupy a large percentage of die area, and require long conversion times.

It would therefore be desirable to be able to provide improved imaging devices for capturing high resolution images.

DETAILED DESCRIPTION

Imaging systems having digital camera modules are widely used in electronic devices such as digital cameras, computers, cellular telephones, medical devices, and other electronic devices. A digital camera module may include one or more image sensors that gather incoming light to capture an image.

Figure 1:
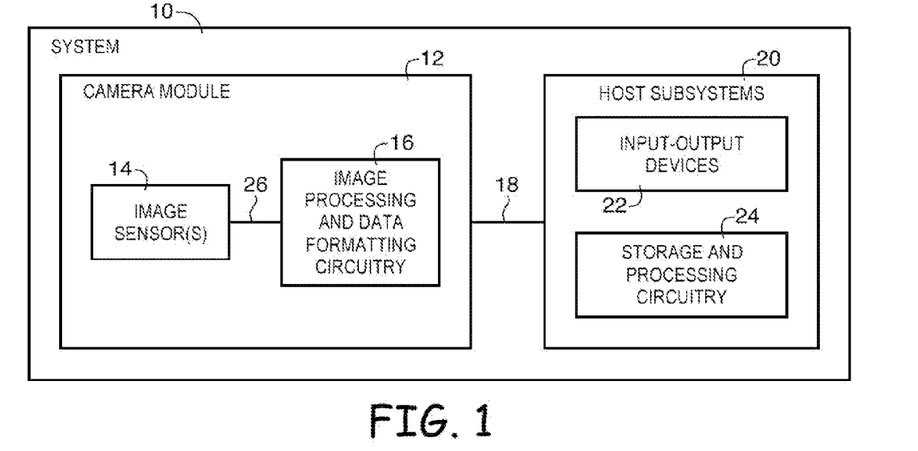
FIG. 1 is a schematic diagram of an illustrative imaging system with a camera sensor in accordance with an embodiment of the present invention.

FIG. 1 is a diagram of an illustrative imaging system that uses an image sensor to capture images. System 10 of FIG. 1 may be a vehicle safety system (e.g., an active braking system or other vehicle safety system), may be a surveillance system, or may be an electronic device such as a camera, a cellular telephone, a video camera, or other electronic device that captures digital image data. System 10 may include camera module 12 having one or more image sensors 14. Image sensor 14 may have one or more associated lenses for focusing light onto image sensor 14. Image sensor 14 may include photosensitive elements (e.g., image sensor pixels) that convert the light into digital data.

In general, image sensor 14 may have any number of pixels (e.g., hundreds, thousands, millions, or more pixels). A typical image sensor may, for example, have millions of pixels (e.g. megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, and other suitable control circuitry for interfacing with the image sensor pixels.

Still and video image data from camera sensor 14 may be provided to image processing and data formatting circuitry 16 via path 26. Image processing and data formatting circuitry 16 may be used to perform image processing functions such as three-dimensional depth sensing, data formatting, adjusting white balance and exposure, implementing video image stabilization, face detection, etc. Image processing and data formatting circuitry 16 may also be used to compress raw camera image files, if desired (e.g., to Joint Photographic Experts Group or JPEG format). In a typical arrangement, which is sometimes referred to as a system on chip (SOC) arrangement camera sensor 14 and image processing and data formatting circuitry 16 are implemented on a common integrated circuit. The use of a single integrated circuit to implement camera sensor 14 and image processing and data formatting circuitry 16 can help to reduce costs.

Camera module 12 may convey acquired image data to host subsystems 20 over path 18 (e.g., image processing and data formatting circuitry 16 may convey image data to subsystems 20). System 10 may provide a user with numerous high-level functions. In a computer or advanced cellular telephone, for example, a user may be provided with the ability to run user applications. To implement these functions, host subsystem 20 of system 10 may include storage and processing circuitry 24 and input-output devices 22 such as keypads, input-output ports, joysticks, and displays. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, or other processing circuits.

Figure 2:
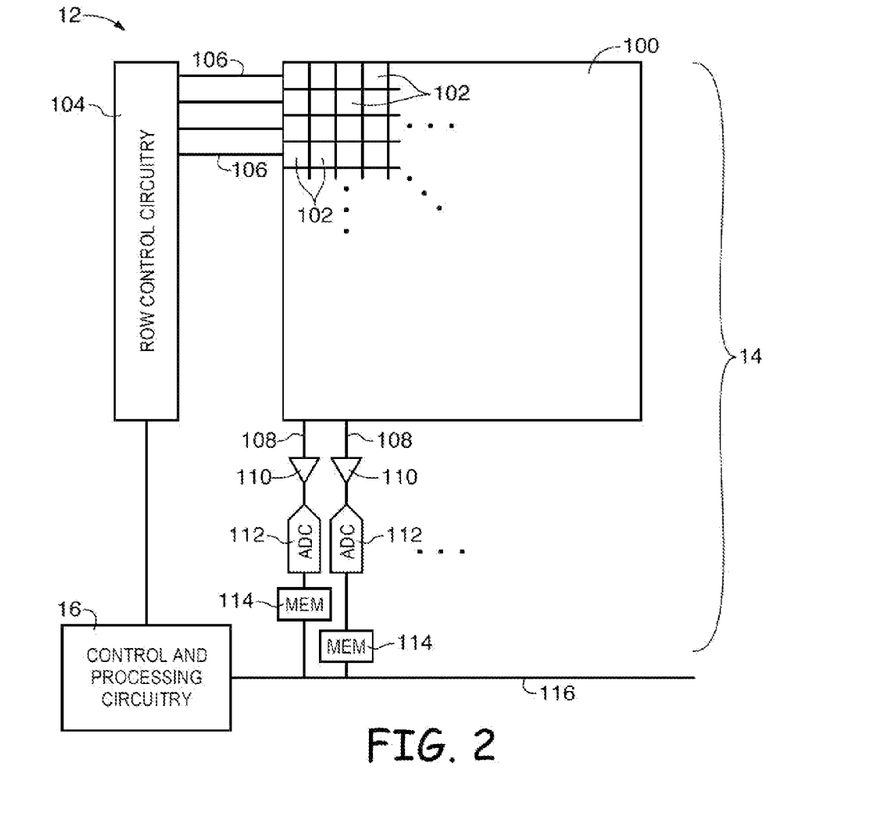
FIG. 2 is a diagram of an illustrative image sensor with an array of image sensor pixels in accordance with an embodiment of the present invention.

An illustrative arrangement for camera module 12 is shown in FIG. 2. As shown in FIG. 2, camera module 12 may include image sensor 14 and control and processing circuitry 16. Image sensor 14 may include a pixel array such as array 100 of image sensor pixels 102. Control circuitry 16 may be coupled to row control circuitry 104 and global data path 116. Row control circuitry 104 may receive row addresses from control circuitry 16 and may supply corresponding row control signals to image pixels 102 over control paths 106. For example, row control circuitry 104 may generate reset signals on reset lines in paths 106, charge transfer control signals on charge transfer control lines in paths 106, and row select (e.g., row readout) signals on row select lines in paths 106 to control the operation of pixels in array 100. If desired, row control circuitry 104 and array 100 may be integrated together in a single integrated circuit (as an example).

One or more conductive lines such as column lines 108 may be coupled to each column of image pixels 102 in image pixel array 100. Column lines 108 may be used for reading out image signals from image pixels 102 and for supplying bias signals (e.g., bias currents or bias voltages) to image pixels 102. During image pixel readout operations, a pixel row in image pixel array 100 may be selected using row control circuitry 104 and image data associated with image pixels 102 of that pixel row may be read out on column lines 108.

Each column line 108 may be coupled to column circuitry such as column amplifier 110, analog-to-digital converter (ADC) circuit 112, and column memory circuit 114. ADC circuit 112 may be used to convert analog signals on column lines 108 into corresponding digital signals before outputting to a corresponding memory circuit 114.

Array 100 may have any number of rows and columns. In general, the size of array 100 and the number of rows and columns in the array will depend on the particular implementation of image sensor 14. While rows and columns are generally described herein as being "horizontal" and "vertical," respectively, rows and columns may refer to any grid-like structure (e.g., features described herein as rows may be arranged vertically and features described herein as columns may be arranged horizontally).

The arrangement of FIG. 2 in which each pixel column line 108 is coupled to a corresponding ADC is sometimes referred to as a parallel column architecture. Conventionally, the ADC in each column is configured to exhibit high resolution. As an example, the ADC in each column may exhibit 12-bit resolution. Such types of high resolution ADCs can, however, consume a significant amount of power, occupy a large percentage of die area, and require long conversion times.

One way of addressing these drawbacks is to reduce the ADC resolution without having to compromise on dynamic range. In order to accomplish this, it may be helpful to understand the components of an image. In general, an image is formed by two factors: (1) the two-dimensional illumination of the scene multiplied by (2) the two-dimensional pattern of reflectance in a scene. Typically, most of the information in the image is contained in the reflectance, which has about 30 dB dynamic range (e.g., which requires only a 5-bit depth). For comparison, the human eye can discriminate about 60 gray levels, which is equivalent to a 6-bit depth. Typical display components have 256 gray levels, which is equivalent to an 8-bit depth.

In accordance with an embodiment, a floating point image sensor readout scheme is described herein. Every analog-to-digital (A/D) conversion should include an exponent conversion followed by a mantissa conversion. The exponent conversion may serve to determine the ADC reference level that is used during mantissa conversion. Performing a floating-point adapted A/D conversion in this way may be faster, may allow use of lower resolution ADCs, which can help reduce power consumption and column circuitry area usage.

As described above, a two-dimensional image may be a function of (1) the amount of source illumination incident on a scene and (2) the amount of illumination reflected by objects in the scene, as shown in the following expression:

$$f(x,y)=i(x,y)*r(x,y) \qquad (1)$$

where illumination i(x,y) has a value between zero and positive infinity, and where reflectance r(x,y) has a value between zero and one. In practice, the illumination has a brightness range of about 170 dB, whereas the reflectance has a brightness range of only about 30 dB. Combining these two components, an image can have up to 200 dB of dynamic range. To cover 200 dB of dynamic, at least a 32-bit depth is required.

However, taking in account that most of the image information is contained in the reflectance r(x,y), a floating point representation of the image signal is proposed:

$$f=r*2^i \qquad (2)$$

where mantissa r represents the reflectance and exponent i represents signal range determined by scene illumination. Assuming that reflectance r has a 6-bit depth, the floating point representation only requires a total of 11 bits instead of 32 bits to resolve 200 dB of brightness range. In this example, the exponent i has a 5-bit depth.

Figure 3:
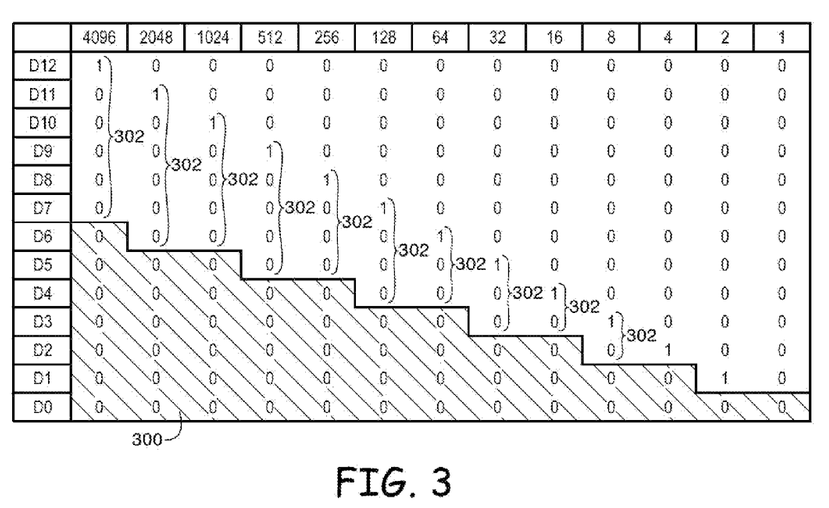
FIG. 3 is a diagram showing the amount of photon noise that is present at different ADC signal levels in accordance with an embodiment of the present invention.

Using this floating point representation, the first term r may be proportional to the image signal $V_S$ when exponent i is equal to zero, whereas the second term $2^i$ may be proportional to the ratio of integration time $T_{int}$ to an ADC reference voltage level Vref. To support the base-2 exponent term, integration time $T_{int}$ and ADC reference voltage level Vref should be incremented in multiples of 2 (e.g., the total light range has to be expressed in powers of 2). The digitized photo signal $V_S$ can therefore be expressed as follows:

$$V_S = \frac{t_{ph}}{q} C_G K_{SF} 2^N \frac{T_{int}}{V_{ref}} \qquad (3)$$

where $I_{ph}$ is the photocurrent, q is the electron charge constant. $C_G$ is equal to the pixel conversion gain, $K_{SF}$ is the pixel source follower gain. N is the ADC bit depth. $T_{int}$ is the integration time and Vref is the ADC reference voltage level. Since $T_{int}$ and Vref should be in power of 2 increments, they can be expressed as follows:

$$T_{int}=2^n T_{int0} \qquad (4)$$

$$V_{ref}=2^m V_{ref0} \qquad (5)$$

where $T_{int0}$ represents the minimum integration time, and where $V_{ref0}$ represents the minimum ADC reference voltage level. Substituting expressions 4 and 5 back into equation 3, equation 3 can then be rewritten as follows:

$$V_S = \left[ C_G K_{SF} 2^N \frac{T_{int0}}{qV_{ref0}} \right] I_{ph} 2^{n-m} \qquad (6)$$

where n depends on the integration time and where m depends on the ADC reference voltage. To determine the necessary bit depth of the mantissa, the amount of photon noise may be considered. Photon noise $V_{ph}$ may be defined as the square root of the mean number of photons in some time interval of interest (as an example). FIG. 3 illustrates LSB (least significant bit) bits that are affected by photon noise (see, shaded LSB bits 300 in FIG. 3) for a 13-bit A/D converter at different signal levels. As shown in FIG. 3, noiseless MSB (most significant bit) bit depth 302 never exceeds 6 bits (e.g., only six MSB bits D7-D12 are noiseless at the "4096" signal level; only five MSB bits D6-D10 are noiseless at the "1024" signal level; only four MSB bits D5-D8 are noiseless at the "256" signal level; only three MSB bits D4-D6 are noiseless at the "64" signal level; etc.). In other words, a 6-bit ADC may be enough to resolve all meaningful (i.e., noiseless) information from a scene instead of the full 13-bit implementation.

An additional parameter that should be accounted for is quantization noise $V_{qn}$, which may be defined as the ratio of $V_{LSB}$ to the square-root of 12 (as an example), where $V_{LSB}$ is equal to $Vref/2^N$. Since $V_{qn}$ is inversely proportional to ADC bit depth N, a lower resolution ADC will yield higher levels of quantization noise. Quantization noise may therefore be relevant because at low light levels, a 6-bit ADC quantization noise can actually limit the signal-to-noise ratio (SNR).

To circumvent this limitation, the ADC reference voltage level may be adapted according to the illumination level, which determines the photon noise $V_{ph}$. Assuming the sensor signal-to-noise ratio $SNR_S$ has to follow the photon-noise-limited signal-to-noise ratio $SNR_{ph}$ with some delta δ, the following equation can be written:

$$20 \log\left(\frac{V_S}{V_{ph}}\right) - 20 \log\left(\frac{V_S}{\sqrt{V_{ph}^2 + V_{qn}^2}}\right) = \delta \quad (7)$$

Substituting the expression of $V_{qn}$, which is a function of Vref and N as described above (e.g., $V_{qn} = Vref/(2_N\sqrt{12})$), and the expression of $V_S$ in equation 6 into equation 7, assuming photon noise is equal to $\sqrt{(V_S K_{SF} C_G)}$, and then solving for Vref would then yield:

$$V_{ref} = 2^N \sqrt{12(10^{\delta/10} - 1) V_S K D_{SF} C_G} \quad (8)$$

Figure 4:
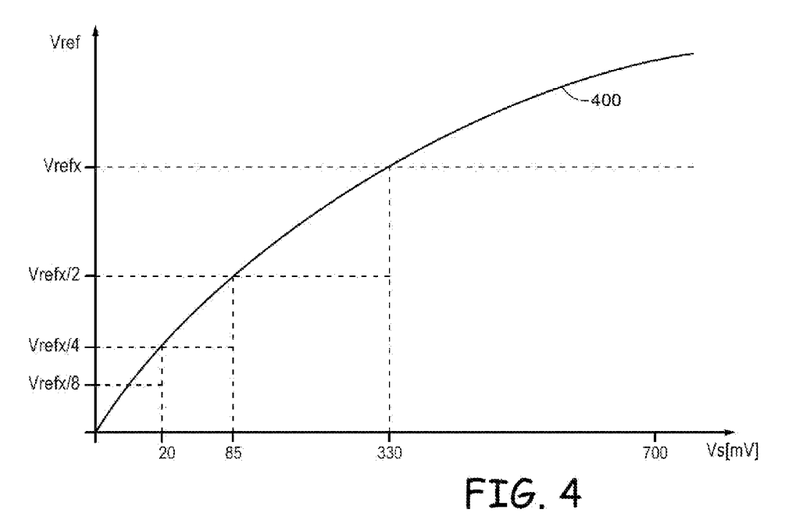
FIG. 4 is a plot of reference voltage level versus pixel signal level showing different reference voltage ranges for achieving satisfactory signal-to-noise ratio (SNR) in accordance with an embodiment of the present invention.

FIG. 4 shows a curve 400 that plots ADC reference voltage Vref versus image signal voltage $V_S$, assuming a pixel saturation level of 700 mV, a 6-bit ADC, and a delta δ of 1 dB. Reference voltage Vref need not follow every point on curve 400 to achieve the desired signal-to-noise ratio. Curve 400 simply sets an upper limit for Vref to achieve or surpass the target SNR.

In accordance with an embodiment, different ADC Vref levels can be selected depending on the image signal level $V_S$. For example, when $V_S$ is between 330 mV and 700 mV, the ADC reference voltage may be set to nominal Vref voltage level Vrefx. When $V_S$ falls between 85 mV and 330 mV, the ADC reference voltage may be switched to a lower reference voltage level Vrefx/2. When $V_S$ falls between 20 mV and 85 mV, the ADC reference voltage may be switched to an even lower reference voltage level Vrefx/4. As shown in the example of FIG. 4, each successive Vref switching points are selected as being powers of two. From the digital processing point of view, Vref switching is equivalent to a voltage range shift, which can be easily implemented. As another example, only seven different Vref values are needed for a 6-bit A/D converter to cover an effective 12-bit range (e.g., a lower resolution ADC can be used to cover a greater effective total resolution using floating point representation).

Figure 5:
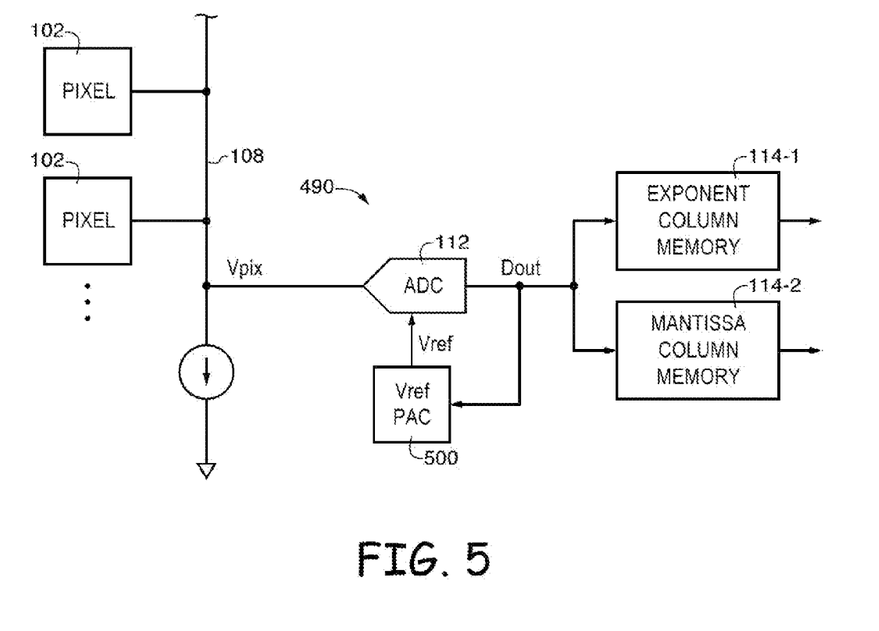
FIG. 5 is a diagram of an illustrative column readout circuit that is operable to perform an exponent conversion followed by a mantissa conversion in accordance with an embodiment of the present invention.

FIG. 5 shows one suitable arrangement of column readout circuitry 490 that supports the floating point representation as described above. Multiple image sensor pixels 102 may be coupled to a common column output line 108. One of the multiple image sensor pixels 102 in that column may be selected for readout. The selected image sensor pixel 102 may output a corresponding pixel signal Vpix to the column readout circuitry 490.

As shown in FIG. 5, column readout circuitry 490 may include an ADC 112, a reference voltage digital-to-analog converter (DAC) 500, and associated floating point memory circuitry such as an exponent column memory circuit 114-1 and mantissa column memory circuitry 114-2. ADC 112 may have an input that receives Vpix from column line 108 and an output on which a digital output signal Dout is generated. The Vref DAC 500 may have an input that receives Dout and an output on which an adjustable Vref signal is provided. The adjustable Vref signal may be selected based on the input signal level as described in connection with FIG. 4.

Figure 6:
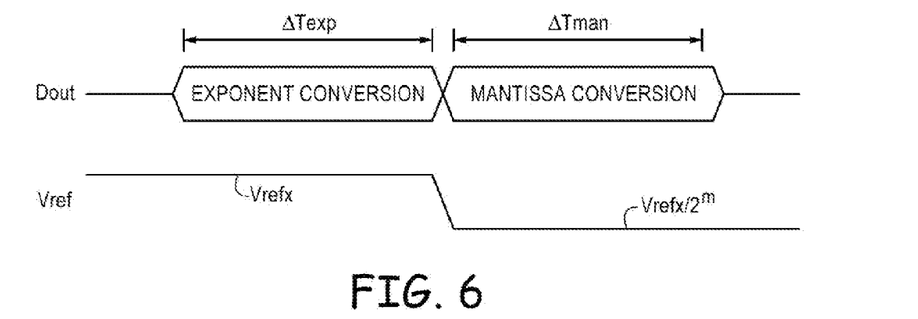
FIG. 6 is a timing diagram showing how reference voltage levels may be adjusted during the exponent and mantissa conversion periods in accordance with an embodiment of the present invention.

FIG. 6 is a timing diagram that illustrates the operation of column readout circuitry 490. As shown in FIG. 6, the ADC conversion starts with an exponent conversion followed by a mantissa conversion. The exponent conversion may last a duration ΔTexp, whereas the mantissa conversion may last a duration ΔTman. The exponent conversion duration ΔTexp is normally much shorter than the mantissa conversion duration ΔTman (e.g., ΔTexp may be 50% of ΔTman, 25% of ΔTman, 10% of ΔTman, 1% of ΔTman, etc.).

DAC 500 may provide the nominal reference voltage level Vrefx to ADC 112 during the exponent conversion to determine the desired Vref level that is to be used during mantissa conversion. The Vref level that is used during mantissa conversion may be power of 2 decrements based on the image signal level (e.g. DAC 500 may set Vref to Vrefx, Vrefx/2, Vrefx/4, Vrefx/8, and so on). This exemplary architecture may be faster and may not exhibit any matching problems between coarse and fine conversion that is commonly seen in conventional two-step ADC column readout configurations.

Figure 7:
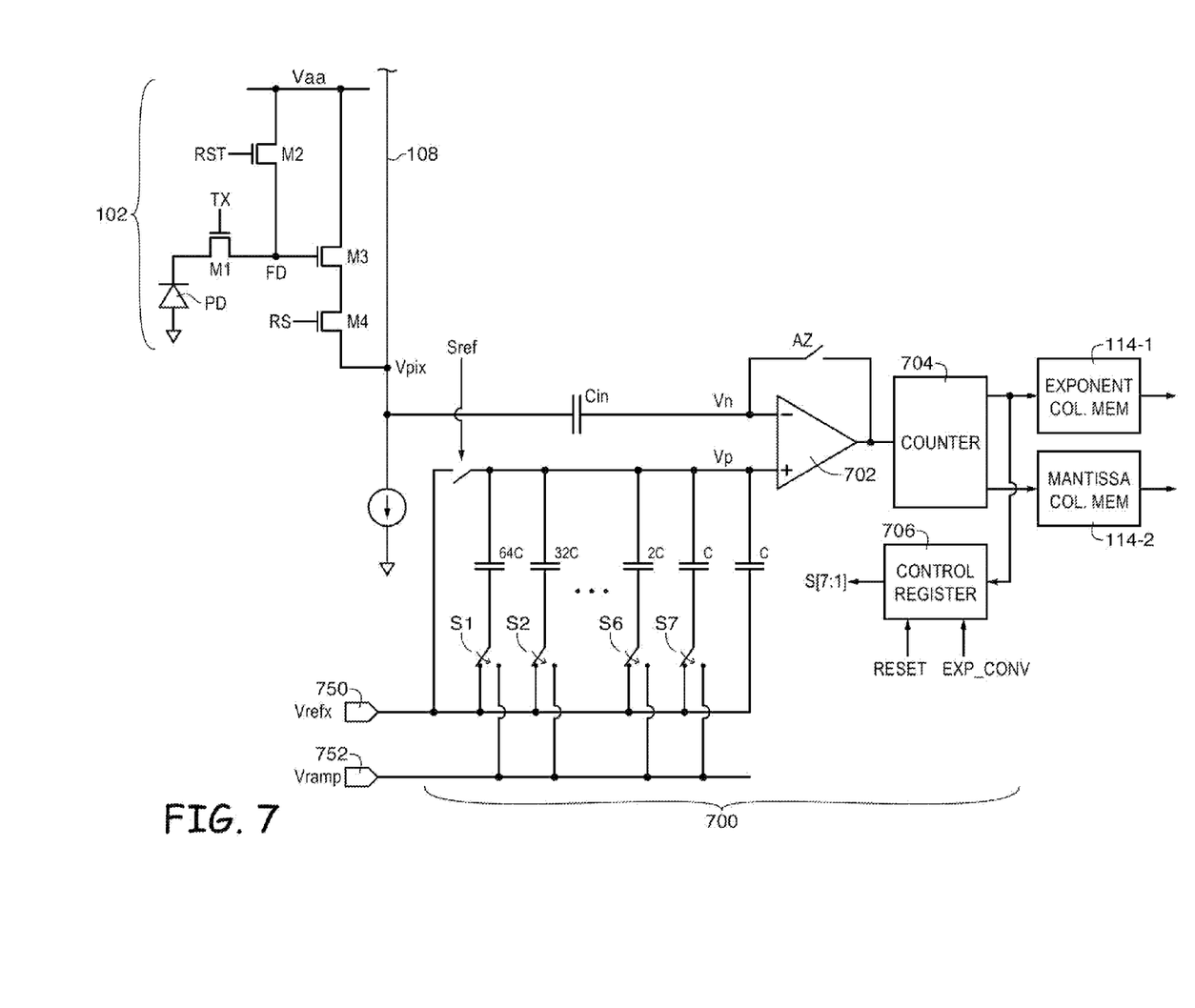
FIG. 7 is a circuit diagram showing one suitable implementation of the column readout circuit of FIG. 5 in accordance with an embodiment of the present invention.

FIG. 7 shows a circuit diagram of exemplary 12-bit single slope ADC readout circuitry of the type described in connection with FIGS. 5 and 6. As shown in FIG. 7, pixel 102 may include a photodiode PD that is coupled to floating diffusion region FD by charge transfer gate M1 (e.g., a transistor pass gate) that is controlled by signal TX. Floating diffusion region FD may be coupled to pixel supply voltage Vaa by reset transistor M2 that is controlled by reset signal RST. Floating diffusion region FD may be coupled to pixel column path 108 via transistor M3 that forms a source-follower amplifier and row select transistor M4 controlled by row select control signal RS. Pixel output column path 108 may serve as a pixel output node shared by the pixels of a column of the array.

During pixel readout operations, a pixel output signal Vpix from a selected pixel 102 may be provided to ADC circuitry 700. As shown in FIG. 7, ADC circuitry 700 may include a comparator circuit such as comparator 702 having a first (positive) input, a second (negative) input, and an output, a signal sampling/coupling capacitor Cin that is coupled between column output line 108 and the negative input of comparator 702, and an auto-zeroing switch that is controlled be signal AZ and that is coupled between the negative input and the output of comparator 702. The signal at the negative (−) input of comparator 702 may be referred to herein as Vn, whereas the signal at the positive (+) input of comparator 702 may be referred to herein as Vp.

A/D converter circuitry 700 may also include a counter such as counter 704 that receives a digital signal at the output of comparator 702 and outputs that are coupled to exponent column memory 114-1 and mantissa column memory 114-2.

Converter circuitry 700 may also include a capacitive Vref DAC circuit (see, e.g., Vref DAC 500 of FIG. 5) having a 7-bit binary weighted capacitor array that can be used to provide 12-bit effective range coverage. The capacitive Vref DAC circuit may have a terminal that is coupled to the positive input of comparator 702. Each of the binary weighted capacitors (e.g., capacitors 64C, 32C, . . . , 2C, and C) may have one end that is coupled to the positive input of comparator 702 and another end that is switchably coupled to a selected one of a Vref voltage supply terminal 750 and a ramp voltage supply terminal 752 via respective switches that are controlled by signals S1, S2, . . . , S6, and S7. Control signals S1-S7 may be provided by a control register 706. Control register 706 may receive output signals from counter 704 and may receive register control such as register reset signal RESET and a register exponent conversion control signal EXP_CONV. Vref supply terminal 750 may also be selectively coupled to the positive input terminal of comparator 702 via a switch that is controlled by signal Sref.

The ramp step can be controlled locally by the capacitive DAC, and the voltage at the positive input of comparator 702 can be expressed as:

$$V_p = V_{ref} - V_{ramp}\left(\frac{n}{128}\right) \quad (9)$$

where n is equal to 64 for the MSB ramp. The ramp signal Vramp may be coupled to only one of the binary weighted capacitors in the array during mantissa conversion. The ramp signal may have 63 steps, which corresponds to 6 bits of accuracy.

Figure 8:
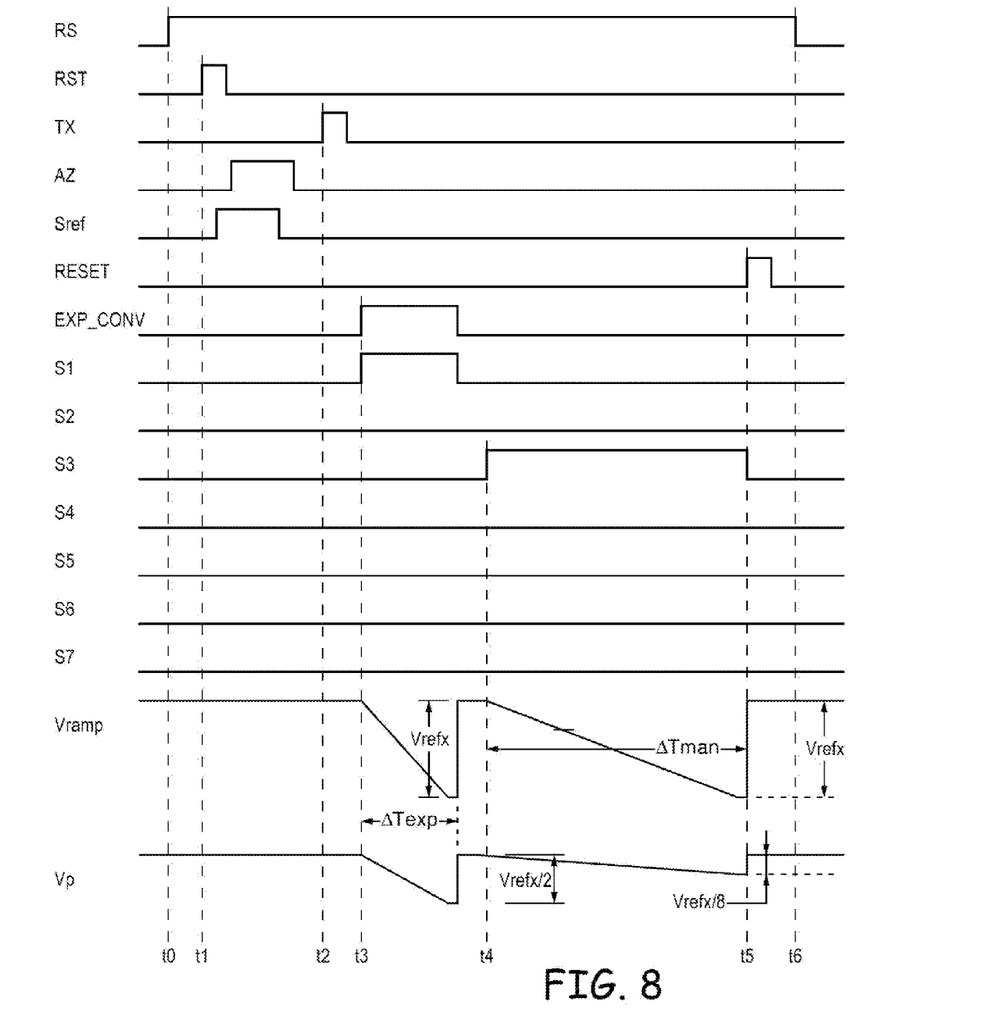
FIG. 8 is a timing diagram illustrating the operation of a column readout circuit of the type shown in FIG. 7 in accordance with an embodiment of the present invention.

FIG. 8 is a timing diagram that illustrates the operation of the column readout circuitry 700 of FIG. 7. At time t0, one of the row select signals RS may be asserted so that a pixel output signal Vpix is provided on the column output line. At time t1, the selected image pixel may be reset by asserting signal RST. Thereafter, signal Sref may be asserted to charge Vp to nominal reference voltage level Vrefx (e.g., by shorting the Vref supply terminal 750 to the positive input of comparator 702). Doing so also connects the top plates of the array of capacitors to the Vref supply. Optionally, signal AZ may also be temporarily asserted to perform autozeroing operations on comparator 702.

At time t2, the accumulated charge in the selected image pixel may be transferred to the floating diffusion node for readout by asserting signal TX. This signal charge transfer may generally pull Vpix and therefore voltage Vn downwards.

At time t3, exponent conversion may be performed by asserting exponent conversion enable signal EXP_CONV and control signal S1 during period ΔTexp. Asserting signal S1 connects the bottom plates of the MSB capacitor (64C) to the ramp voltage Vramp, giving Vramp the largest step size. While Vramp is being ramped down, comparator 704 will flip at some point and the counter will latch a corresponding value, which may be stored in exponent column memory 114-1 and may be fed to the control register 706. Control register 706 decodes this latched value and connects Vramp to the bottom plate of only one of the DAC capacitors for mantissa conversion.

In the example of FIG. 7, only signal S3 is asserted to switch capacitor 16C into use, giving Vramp a step size that corresponds to an adjusted Vref level of Vrefx/8 during the mantissa conversion period (at time t4). As shown in FIG. 8, the ramp step during the mantissa conversion period is different than the ramp step during the exponent conversion period (see, signal Vp waveform in FIG. 8). As another example, asserting only signal S2 will switch capacitor 32C into use, giving Vramp a step size that corresponds to an adjusted Vref level of Vrefx/4 during mantissa conversion. As yet another example, asserting only signal S6 will switch capacitor 2C into use, giving Vramp a step size that corresponds to an adjusted Vref level of Vrefx/64 during mantissa conversion. While Vramp is being ramped down during ΔTman, comparator 704 will flip at some point and the counter 704 will latch a corresponding value, which may be stored in mantissa column memory 114-2.

At the end of the mantissa conversion (i.e., at time t5), the register reset control signal RESET may be asserted to short the bottom plates of all DAC capacitors back to Vref (e.g. by shorting the bottom plates of all the capacitors in the DAC array to the Vref supply terminal 750).

In this particular example, the exponent conversion time may be only seven clock cycles while the mantissa conversion time may be less than 63 clock cycles, therefore, the total 12-bit conversion time is just 70 clock cycles, which is substantially less than the 4095 clock cycles that are required for conventional signal slope ADCs or the 128 clock cycles that are required for conventional two-step single slope ADCs. Implementing floating point capable column readout circuitry in this way can therefore help speed up ADC conversion time and help reduce power consumption while allowing use of lower resolution ADCs, which can also help reduce die area and cost.

The example of FIG. 7 in which floating point ADC circuitry 200 is implemented using a single slope ADC is merely illustrative and does not serve to limit the scope of the present invention. If desired, ADC circuitry 200 may be implemented using other types of A/D converting circuits such as multi-slope ADCs, successive approximation ADCs, flash ADCs. Wilkinson ADCs, pipeline ADCs, sigma-delta ADCs, time-interleaved ADCs, a hybrid of these different types of ADCS, and/or other suitable types of ADCs.

Figure 9:
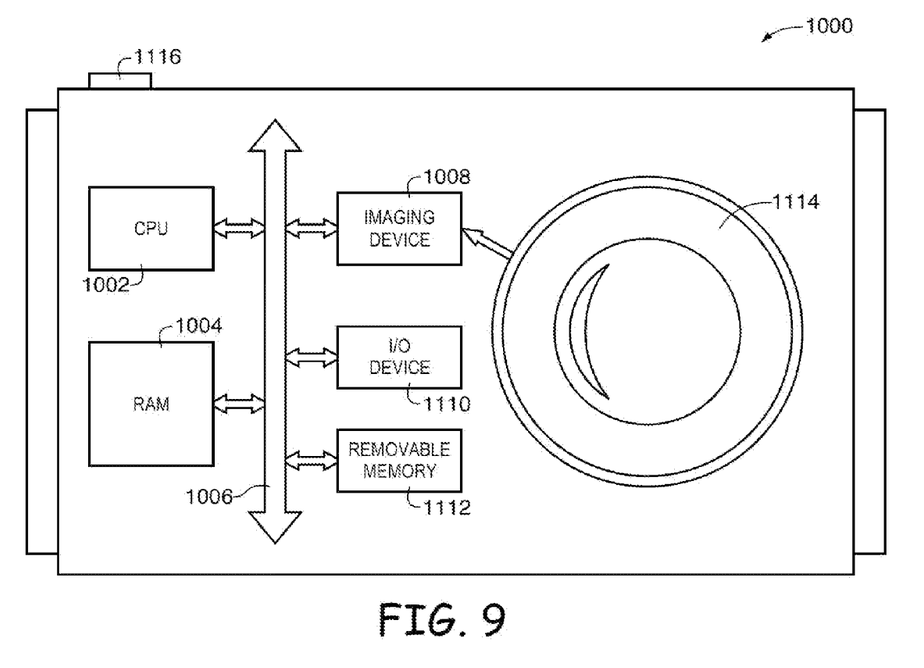
FIG. 9 is a block diagram of a system employing the embodiments of FIGS. 5-8 in accordance with an embodiment of the present invention.

FIG. 9 is a simplified diagram of an illustrative processor system 1000, such as a digital camera, which includes an imaging device 1008 (e.g., the camera module of FIG. 1) employing an imager having pixels with improved pixel readout and analog-to-digital conversion capabilities as described above. Without being limiting, such a system could include a computer system, still or video camera system, scanner, machine vision system, vehicle navigation system, video phone, surveillance system, auto focus system, star tracker system, motion detection system, image stabilization system, and other systems employing an imaging device.

Processor system 1000, for example a digital still or video camera system, generally includes a lens 1114 for focusing an image onto one or more pixel array in imaging device 1008 when a shutter release button 1116 is pressed and a central processing unit (CPU) 1002 such as a microprocessor which controls camera and one or more image flow functions. Processing unit 1102 can communicate with one or more input-output (I/O) devices 1110 over a system bus 1006. Imaging device 1008 may also communicate with CPU 1002 over bus 1006. System 1000 may also include random access memory (RAM) 1004 and can optionally include removable memory 1112, such as flash memory, which can also communicate with CPU 1002 over the bus 1006. Imaging device 1008 may be combined with the CPU, with or without memory storage on a single integrated circuit or on a different chip. Although bus 1006 is illustrated as a single bus, it may be one or more busses, bridges or other communication paths used to interconnect system components of system 1000.

Various embodiments have been described illustrating imagers with pixels having improved pixel readout and analog-to-digital conversion capabilities.

An imager may include an array of image sensor pixels arranged in rows and columns. Each image pixel along a column may be coupled to a column output line. One of the image pixels along the column may be selected for readout. The selected image sensor pixel may output an analog pixel signal onto the column output line.

The imager may also include column readout circuitry for converting the analog pixel signal into a corresponding floating point number. The column readout circuitry may include an analog-to-digital converter (ADC) that generates an exponent value for the floating point number during a first time period and that generates a mantissa value for the floating point number during a second time period following the first time period. The second time period may generally be longer than the first time period (i.e., the mantissa conversion may be longer than the exponent conversion, or vice versa). The exponent value may be stored in a corresponding exponent memory circuit, whereas the mantissa value may be stored in a corresponding mantissa memory circuit.

The column readout circuitry may also include a digital-to-analog converter (DAC) that receives a digital output signal from the ADC and that supplies an adjustable reference voltage to the ADC. The DAC may be configured to supply a fixed nominal reference voltage to the ADC during the exponent conversion period and to supply an adjustable reference voltage that may be lower than the nominal reference voltage to the ADC during the mantissa conversion period. The adjustable reference voltage may be decremented from the nominal reference voltage by some power of two during the mantissa conversion. The ADC may be implemented using a single slope ADC (as an example). If desired, the DAC may include binary weighted capacitors to help supply ramp signals to the ADC with adjustable step sizes.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. An image sensor, comprising:
    a plurality of image sensor pixels;
    an output line that is coupled to the plurality of image sensor pixels; and
    readout circuitry that is coupled to the output line and that converts an analog pixel signal received from a selected image sensor pixel in the plurality of image sensor pixels via the output line into a corresponding floating point number, wherein converting the analog pixel signal into the corresponding floating point number involves performing an exponent conversion and a mantissa conversion, and wherein the readout circuitry uses a first ramp step while performing the exponent conversion and a second ramp step that is different from the first ramp step during the mantissa conversion.

2. The image sensor defined in claim 1, wherein the readout circuitry comprises:
    an analog-to-digital converter (ADC) that generates an exponent value for the floating point number during a first time period and that generates a mantissa value for the floating point number during a second time period after the first time period.

3. The image sensor defined in claim 2, wherein the readout circuitry further comprises:
    an exponent memory circuit that stores the exponent value; and
    a mantissa memory circuit that stores the mantissa value.

4. The image sensor defined in claim 2, wherein the readout circuitry further comprises:
    a digital-to-analog converter (DAC) that receives an output signal from the ADC and that supplies an adjustable reference voltage to the ADC.

5. The image sensor defined in claim 4, wherein DAC supplies a first reference voltage to the ADC when the exponent has a first value and supplies a second reference voltage that is different than the first reference voltage to the ADC when the exponent has a second value that is different than the first value.

6. The image sensor defined in claim 4, wherein the DAC supplies a nominal reference voltage to the ADC during the first time period, and wherein the DAC adjusts the reference voltage that is supplied to the ADC during the second time period based on the exponent value.

7. The image sensor defined in claim 4, wherein the ADC comprises a single slope analog-to-digital converter, and wherein the DAC includes binary-weight capacitors.

8. A method of operating an image sensor, comprising:
    selecting an image sensor pixel from a plurality of image sensor pixels for readout;
    using the selected image sensor pixel to output a pixel signal onto an output line; and
    with analog-to-digital converter (ADC) circuitry, converting the pixel signal into a corresponding floating point number by performing an exponent conversion and a mantissa conversion for the floating point number, wherein the ADC circuitry comprises a single slope analog-to-digital converter, and wherein converting the pixel signal comprises using a first ramp signal with a first ramp step during the exponent conversion and using a second ramp signal with a second ramp step that is different than the first ramp step during the mantissa conversion.

9. The method defined in claim 8, wherein the exponent conversion is performed before the mantissa conversion.

10. The method defined in claim 8, wherein converting the pixel signal comprises performing data conversion using a fixed nominal reference voltage during the exponent conversion and using an adjustable reference voltage that is no greater than the fixed nominal reference voltage during the mantissa conversion.

11. The method defined in claim 8, wherein converting the pixel signal comprises performing data conversion using a fixed nominal reference voltage during the exponent conversion and using an adjustable reference voltage that is less than the fixed nominal reference voltage during the mantissa conversion.

12. The method defined in claim 8, wherein converting the pixel signal comprises performing data conversion using a fixed nominal reference voltage during the exponent conversion and using an adjustable reference voltage that is that is decremented from the fixed nominal reference voltage by some power of two during the mantissa conversion.

13. The method defined in claim 8, wherein performing the exponent conversion comprises performing the exponent conversion during a first time period, and wherein performing the mantissa conversion comprises performing the mantissa conversion during a second time period that is longer than the first time period.

14. A system, comprising:
- a central processing unit;
- memory;
- input-output circuitry; and
- an imaging device, wherein the imaging device comprises:
  - an array of image sensor pixels;
  - a column output line that is coupled to a portion of the array of image sensor pixels; and
  - column readout circuitry coupled to the column output line, wherein the column readout circuitry is configured to perform exponent conversion and mantissa conversion on analog pixel signals received at the column readout circuitry via the column output line, wherein the column readout circuitry comprises:
    - a digital-to-analog converter (DAC) that generates a fixed reference voltage during the exponent conversion and that generates an adjustable reference voltage that is decremented from the fixed reference voltage by some power of two during the mantissa conversion.

15. The system defined in claim 14, wherein the column readout circuitry comprises a digital-to-analog converter (DAC) that generates an adjustable reference voltage.

16. The system defined in claim 14, wherein the column readout circuitry comprises a single slope analog-to-digital converter (ADC) circuit.

17. The system defined in claim 14, wherein the column readout circuitry has an effective resolution, and wherein ADC circuit has a resolution that is less than the effective resolution.

* * * * *